(12) United States Patent
Moshirnoroozi

(10) Patent No.: US 8,299,719 B1
(45) Date of Patent: Oct. 30, 2012

(54) INDIVIDUALLY SELECTIVE INTELLIGENT LIGHTING SYSTEM

(76) Inventor: Masoud Moshirnoroozi, San Diego, CA (US)

( * ) Notice: Subject to any disclaimer, the term of this patent is extended or adjusted under 35 U.S.C. 154(b) by 274 days.

(21) Appl. No.: 12/660,253

(22) Filed: Feb. 24, 2010

Related U.S. Application Data

(60) Provisional application No. 61/209,345, filed on Mar. 6, 2009.

(51) Int. Cl.
*H05B 37/00* (2006.01)
(52) U.S. Cl. ............ 315/185 R; 315/316; 315/318
(58) Field of Classification Search ......... 315/185 R, 315/312–318; 362/551, 600, 555, 122, 559, 362/646
See application file for complete search history.

(56) References Cited

U.S. PATENT DOCUMENTS

| | | | | |
|---|---|---|---|---|
| 5,793,627 A | * | 8/1998 | Caldes et al. | 363/146 |
| 6,777,891 B2 | * | 8/2004 | Lys et al. | 315/291 |
| 7,175,302 B2 | * | 2/2007 | Kazar et al. | 362/231 |
| 8,052,303 B2 | * | 11/2011 | Lo et al. | 362/249.05 |
| 2004/0066148 A1 | * | 4/2004 | Oskorep et al. | 315/185 S |
| 2008/0157688 A1 | * | 7/2008 | Gibboney | 315/185 S |

* cited by examiner

*Primary Examiner* — Jacob Y Choi
*Assistant Examiner* — Henry Luong
(74) *Attorney, Agent, or Firm* — Mark Wisnosky

(57) ABSTRACT

The present invention is an individually selective intelligent serial lighting system, wherein lighting elements are arranged in a specific configuration so that unknown location and identity of each randomly distributed registered integrated circuit switch device, which drives lighting elements, is automatically detected, recorded and addressed. A controller, individually controls every single LED, or other lighting element distributed along the length of lighting string with fixed set of wires. Each lighting element is mounted on or connected to and driven from a Switch PCB, consisting an integrated circuit switch, each programmed or lasered with a unique serial number, with at least two ports and a communication protocol. Software routines are intelligent in a sense that find position of each individual lighting element when any existing or new lighting element or cable assembly is attached to or detached from the system whether in operation and alive or upon power up.

12 Claims, 3 Drawing Sheets

INDIVIDUALLY SELECTIVE INTELLIGENT LIGHTING SYSTEM

CROSS REFERENCE TO RELATED APPLICATIONS

This application claims benefit under 35 U.S.C. 119(e) of U.S. Provisional Application Ser. No. 61/209,345, filed Mar. 6, 2009, entitled "Individually Selective Intelligent Serial Lighting System"

The foregoing application is hereby incorporated herein by reference.

BACKGROUND OF THE INVENTION

Light strings and motion lights are widely used in variety of occasions and places, using LEDs, light bulbs or other light generating devices. There are variety of lighting patterns used over the buildings, Christmas trees and other places to create attractions. These lighting systems are often simple blinking or chasing patterns, without full control capability over every individual lighting element of the entire system, from only one place, and with only one control unit, and on a fixed set of wires throughout the system.

Compared to higher end systems using several of very expensive and complex electronic controllers across the system for distribution of power and control signals, the present invention has very simple and inexpensive implementation, involving only 4 conductors in one simple embodiment and only one controller from one place to communicate with the entire system, in order to selectively control individual light elements without the need of several mid-control devices and relays across the system and without the need of running many wires and connections.

FIELD OF THE INVENTION

The present invention relates generally to the field of lighting systems and networks of lighting strips and particularly to methods and apparatus for control of light sources that are used for the purpose of warnings, signaling, guidance, decoration, entertainment, space illumination, attraction, indication, attention of viewers and lighting of sites, buildings, fields and trees.

DESCRIPTION OF RELATED ARTS

One of the techniques currently used to light up LED and light bulb sets and to create a feeling of light motion, is by grouping, sharing and connecting a set of lights in one electrical connection so that each group turns on together, then this light group is interlaced with the next adjacent similar light group of another electrical line. By turning each group On and Off at a time, the lights seems to be moving. In the above scheme, to achieve larger variation of patterns, if number of interlaced groups is increased, while maintaining the same number of lighting elements, which would result in reduction of light quantity in each group, then quantity of groups and conductors controlling each group would grow, and therefore a big chunk of cable or wires must be utilized to control more groups of light elements to create more patterns. For this reason at some point, using aforementioned system to control every single LED, individually and selectively, becomes impractical and virtually almost impossible when quantity of LEDs and lights grow. The technique mentioned above, limits quantity of LEDs and light bulb groups in a motion light set to 3 or 4 groups, because each group needs a separate wire for controlling that group.

Another technique is using diode in each branch of LED and light bulb sets with an alternating current source, which still has the same limitation of added conductors and connections as described above.

Except as required and dictated by high voltage applications, in a preferred embodiment of the current invention, low voltage Direct Current (DC) is used in the entire system for providing power to lighting elements. This makes the lighting system very safe against fire hazards, safety of children or other hazards compared to those which directly use high voltage from wall outlet AC line. For example in U.S. Pat. No. 7,609,006, high voltage is present all over the lighting string, which makes it very unsafe in most applications.

BRIEF SUMMARY OF THE INVENTION

An individually selective intelligent serial lighting system, which is arranged in set(s) of serial string configuration(s), is capable of selectively control each lighting element, individually or in groups, regardless of the lighting element position in the chain, using fixed set of only 4 wires in one embodiment, creating possibility of designing a vast variety of colorful patterns with fully controllable timings on each lighting element's On or Off duration.

The present invention, in a preferred embodiment, is comprised of a Power Supply, a Controller Unit that contains Microcontroller Printed Circuit Board, and one or more Cable Assemblies or network of Cable Assemblies. Cable Assembly is connected to and controlled by Controller Unit. Microcontroller Board holds a Power supply receptacle, a Reset Button, at least one Pattern Select Button, a Power regulator, a Microcontroller, a Power indicator LED and an optional Reverse Supply protector diode, as well as other circuit components.

Each Cable Assembly comprises at least one switch printed circuit board Assembly. In one embodiment, an optional Extension Connector is used to extend the length of Cable Assembly. Length of lighting cable or network of lights can optionally be extended or reduced by attaching or detaching Cable Assemblies through Extension Connectors. In one embodiment, a heat shrink tubing covers cable connections to Switch PCB. Switch PCB assemblies are distributed along the length of each Cable Assembly. Each Switch PCB connects to the adjacent Switch PCB by a 4-conductor cable. In one embodiment, a dual channel addressable switch and one or more LEDs or light bulbs are either directly mounted on each of the small PCBs or connected to and driven from the Switch PCB. An example dual channel addressable switch is the 1-Wire® device manufactured by Maxim Integrated Products, Inc. 1-Wire and Maxim are registered trademarks of Maxim Integrated Products, Inc. a United States, Delaware corporation. Length of the lighting system can potentially be from a few centimeters to kilometers.

This lighting system is comprising a plurality of LEDs of any size, shape or type, light bulbs of any size, shape or type, or any electrical light generating device which can be driven by an electronic or electrical driver, relay or contactor. In one embodiment of the current invention, each light element is controlled by a programmable integrated circuit device capable of being programmed or configured with a communication protocol, with at least two input/output ports and with a programmable unique at least 16 bits wide identifiable identity serial number. In one embodiment of the current invention, dual channel addressable switch device is used for this purpose, which is capable of a communication protocol, has two ports, and each device has a unique 64 bits lasered serial number. Use of such a dual channel addressable switch makes it possible to have full control of individual lights on only one pair of twisted wire. It should be realized that mere use of 1-Wire® or any other communication protocol without specific configuration, topology and arrangement of the system, which is the subject matter of the current invention, would not result in achieving individual selective light element control. 1-Wire® devices use a standard communication protocol, which is well known to skilled people involved in this art.

In one embodiment of this invention, upon power up and after initial device search and registration, each dual channel addressable switch is addressed and selected by microcontroller and turned on for duration of time specified by pattern generator of software routines. As an optional feature, each press of Select pushbutton will sequentially select and switch to a different pattern.

During manufacturing process of a serial lighting string, and when attaching or detaching extension cable assemblies containing dual channel addressable devices or when dual channel addressable devices come from manufacturer, serial numbers of discrete dual channel addressable switch devices are often all mixed up, and search hex code 0xF0 provided in the protocol is not able to determine where and in what physical position of a row, each dual channel addressable device is located at, resulting in not being able to address a device in a specific physical position in a row of a lighting system.

Even though search algorithms and routines provided with the example 1-wire® products are able to read and find all registered elements and devices in a network, however, these algorithms do not know and do not recognize sequential and specific physical location and position of each registered element in a serial network. In simple words, available search routines don't tell you what is the serial number of for example, the tenth device in a serial row, or for example which serial number, addresses and turns on the fifth switch device in a serial connection. When a search finds a serial number of a device, if you use that specific serial number to address and turn on that device, you don't know if you are addressing the first, the last or one other middle device in a group of devices lined up in series on a network, and therefore not being able to generate and create any specific pattern, since you won't know which position will turn on.

In an example 1-Wire® system, only one wire is used for both powering devices and for communication with devices. Also a ground wire is used for signal return making a two-wire system.

This invention has a combination of specific hardware configuration along with software routines and algorithms which makes it possible to selectively find and address each individual lighting element in the system. In one embodiment of the current invention, the lighting elements driven by switch PCBs, are serially lined up along the length of a single cable with only 4-conductors, which are used for powering and communication with the entire system. Two of the aforementioned wires are dedicated to dual channel addressable switch network as required by the exemplary 1-Wire® system. One of the four aforementioned wires is provisioned to make it possible to find the position of each device in the system. One other of the 4-conductor lines is intended to provide power to the lights or other devices used in the system.

In one embodiment of the current invention, when one or more cable assemblies are added to the system, software routines automatically detect, recognize and register all new added switch devices mounted on switch PCBs, even when the system is in operation and alive. Upon connection of new switch devices, system will reset and will continue from where it was left off. Control unit is able to sense and detect when the very first light string is connected to or detached from the control unit.

In one embodiment of the current invention, one or more LEDs are mounted on both sides of switch printed circuit board.

In another embodiment of the current invention, one LED is mounted in a cutting hole on the switch PCB so that the LED and light is exposed and seen from both sides of switch PCB.

In one embodiment of the current invention, each individual switch PCB, drives and controls another electronic or electrical driver such as MOSFET, transistor, Darlington, relay, contactor or any other voltage or current sourcing device, or any combination thereof, mounted on or connected to switch PCB, which in turn drives LEDs, laser diodes, light bulbs or any other electrical light generating sources.

In one aspect of the current invention, cable assemblies are connected in mesh, star, triangle, parallel, curtain or any other possible topologies.

In another aspect of the current invention, when the length of system becomes long, to compensate for signal strength and signal to noise ratio reduction, one or more signal booster or amplifiers are used in appropriate locations.

In another aspect of the current invention, a smaller AWG gauge wire, meaning larger and thicker DC or AC supply wire is used with longer cable lengths and heavier load currents. DC-DC converters are used to compensate for voltage drop in light string when required.

In another aspect of the current invention, cable assembly can be of any length and is only limited by total load current and cable thickness, as well as limitations imposed by the nature of communication used.

In another aspect of the current invention, a DC power supply source such as battery is either used as the sole power source for the entire system or is used in combination with other power sources.

In another aspect of the current invention, a solar cell power source is either used for charging batteries and powering the entire system, or is used in combination with other power sources.

In another aspect of the current invention, an AC power source wire is added or used in combination with the DC line, instead of VCC DC power line, to feed light bulbs or other light generating devices that use AC power or both DC and AC power source.

In another aspect of the current invention, a USB, SPI, UART, I2C, TWI or other communication channel and means is used to program or control Controller Unit and to create patterns through an API (Application Programming Interface), or other interfaces running on a PC or other programming device.

In another aspect of the current invention, a keypad with optional LCD display is used to control and program patterns into the controller unit.

In another aspect of the current invention, a wireless device programs or controls controller unit through an on-board wireless transceiver.

In another aspect of the current invention, the entire cable assembly or switch PCB Assembly and cable connections are sealed with or covered with transparent plastic or other sealing material to be able to use the lighting system under water or in wet areas, when the lighting system is powered with safe low voltage DC supply.

In another aspect of the current invention, all switch PCB assemblies along with cable or wire connections to switch PCB assemblies are sealed or covered with transparent plastic, heat shrink or other sealing materials to be able to use the lighting system under water or in wet and moist environment, when the lighting system is powered with safe low voltage DC supply.

In another aspect of the current invention, lighting strings along with all printed circuit boards and wires are extruded with clear material.

In another aspect of the current invention, a light sensor prevents the lighting system to turn on during the day light.

In another aspect of the current invention, a motion detector sensitive to human body or other objects, provides a means to save energy where lighting system will only turn on when somebody or some object is moving nearby.

In another aspect of the current invention, multi color LED is used to create color effects and eye-catching colorful patterns.

In another aspect of the current invention, various mounting configurations retain lighting string using retainer elements which can be mounted on various interior and exterior structures.

In another aspect of the current invention, lighting strings are formed and shaped to create either individual alphanumeric characters or as a chain of serial or meshed network of connected alphanumeric characters. Lighting strings may also be formed in any other shape to adapt any specific application.

In another aspect of the current invention, microcontroller used in control unit is substituted with an field programmable gate array (FPGA) or other programmable device, capable of providing all features and functionalities similar to a microcontroller, which would be necessary to generate all required signals to drive all cable assemblies and switch PCBs.

DETAILED DESCRIPTION OF THE INVENTION

Figure 1:
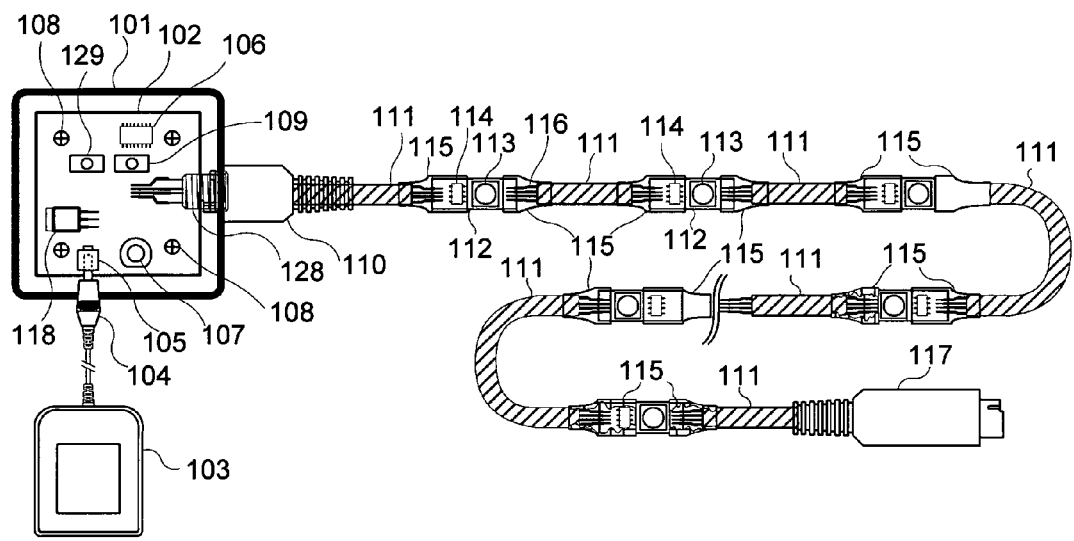
FIG. 1 is a preferred embodiment top view of an individually selective intelligent serial lighting system of the present invention wherein a dual channel addressable switch devices are used in switch PCB assemblies. For the purpose of clarity, in this view, the top covering lead of microcontroller board enclosure box is removed and not shown.
Figure 2:
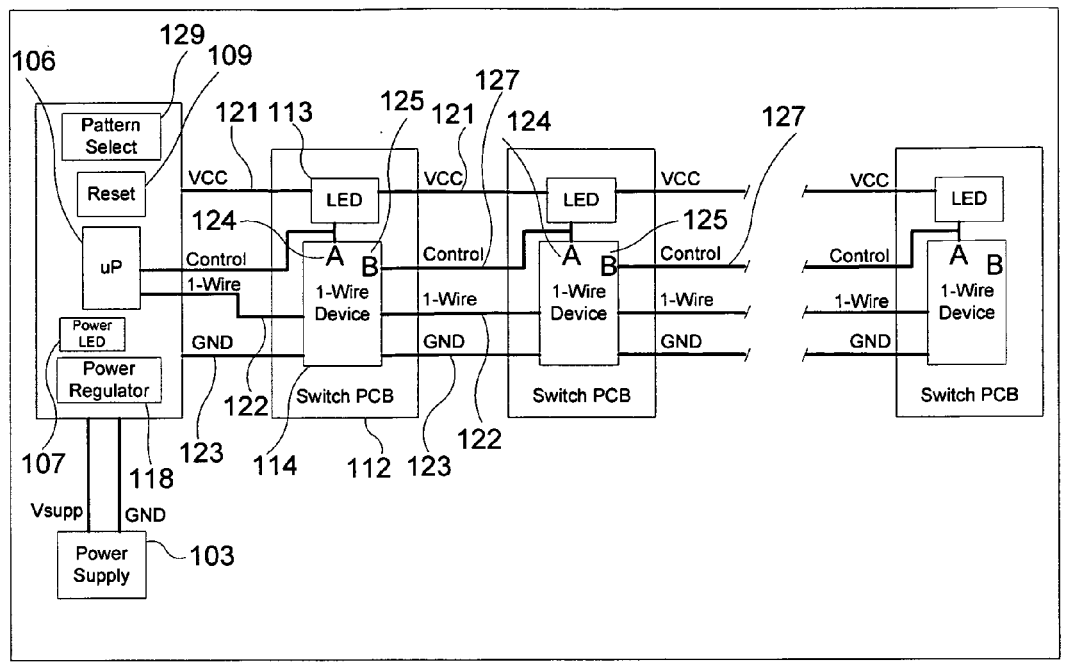
FIG. 2 is a preferred embodiment of an individually selective intelligent serial lighting system Block Diagram of the present invention wherein the exemplary 1-Wire® dual channel addressable switch devices are used in switch PCB assemblies.

Referring to FIG. 1 and FIG. 2, in a preferred embodiment, controller unit 101 is connected to a cable assembly by connecting 4-pin plug circular DIN connector 110 to 4-pin receptacle circular DIN connector 128. Cable assembly consisting at least one switch printed circuit board (PCB) assembly 112, is distributed along the length of 4-conductor cable 111. Adjacent switch PCBs are interconnected through cable 111, which has 4 individual conductors 116 including VCC wire 121, ground wire 123, Control wire 127 and communication wire 122, soldered to switch printed circuit board assembly. Heatshrink 115 is covering and protecting switch printed circuit board assembly 112 and wires 116. switch printed circuit board assembly 112 comprising two LEDs 113, one mounted on component side, and the other one mounted on solder side of PCB, a 1-Wire addressable dual switch device 114, and a current limiting resistor (not shown). Optional 4-pin male circular DIN rear end connector 117 is used to attach another cable assembly in order to extend the length of light string. Controller printed circuit board assembly 102, which is mounted inside controller unit 101 through four mounting holes 108, comprising microcontroller 106, power regulator circuit 118, power supply connector 105, reset pushbutton 109, pattern select pushbutton 129, and power indicator LED 107. Wall adapter 103 provides required DC supply voltage through power plug 104.

FIG. 2 is a sketch of individually selective intelligent serial lighting system block diagram. As can be seen, port B 125 of the very first dual channel addressable switch 114 of the chain is connected to port A 124 of the very next adjacent dual channel addressable switch 114 on switch printed circuit board assembly 112. Similarly, port B 125 of the second dual channel addressable switch is connected to port A 124 of the very next adjacent dual channel addressable switch. This same pattern of connection continues through the last dual channel addressable switch in the chain. On every switch printed circuit board assembly 112, a pair of LED 113 is electrically connected in parallel and pulled up to VCC 121. LED 113 is driven by port A 124 of dual channel addressable switch through a current limiting series resistor.

Figure 3:
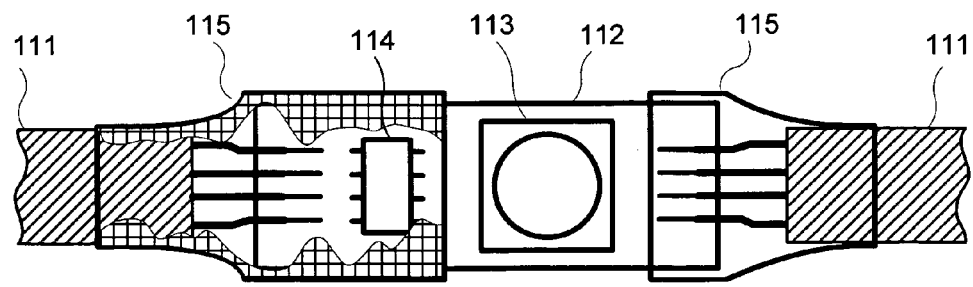
FIG. 3 is a closer detail view of switch printed circuit board (PCB) assembly of the present invention.

FIG. 3 depicts a closer look at switch printed circuit board assembly 112.

Based on hardware configuration described above, upon power up, software routines search and register all existing serial numbers of all dual channel addressable switch present in the entire system. Software algorithms, through control line 127 and line 122, then probe, read, sort and record position of each individual dual channel addressable switch 114.

When software routines find all existing dual channel addressable switches and recognize their position, it generates variety of patterns based on the position of lighting elements in light string by addressing each individual recognized and recorded serial number. All existing patterns provided by software are played in sequence and rolled over at the end. When system is in operation and alive, software routines continuously check all existing devices against recorded ones to detect and recognize any change in quantity, position and serial number of dual channel addressable switches in the entire chain.

Figure 4:
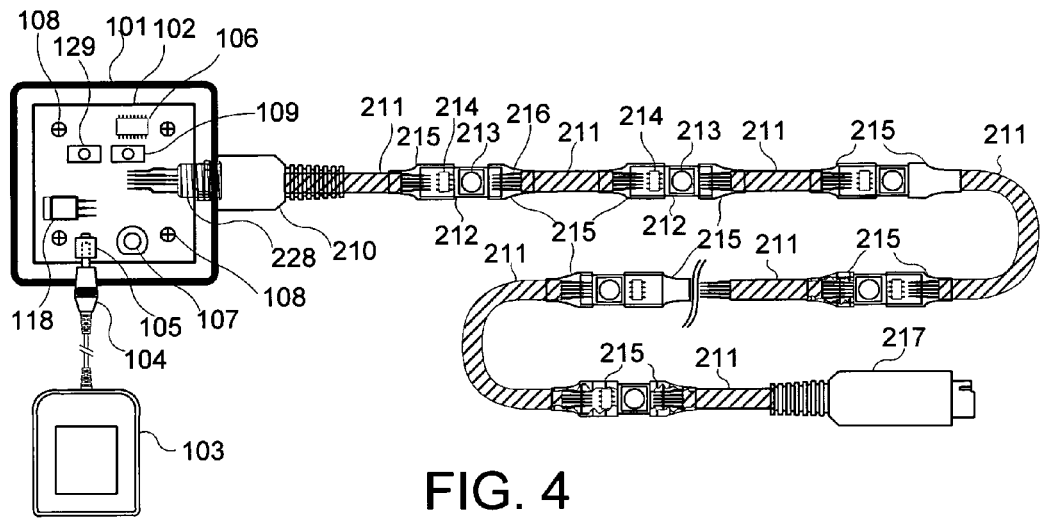
FIG. 4 is an illustration of another embodiment top view of an individually selective intelligent serial lighting system of the present invention wherein FPGA devices are used in switch PCB assemblies. For the purpose of clarity, in this view, the top covering lead of microcontroller board enclosure box is removed and not shown.
Figure 5:
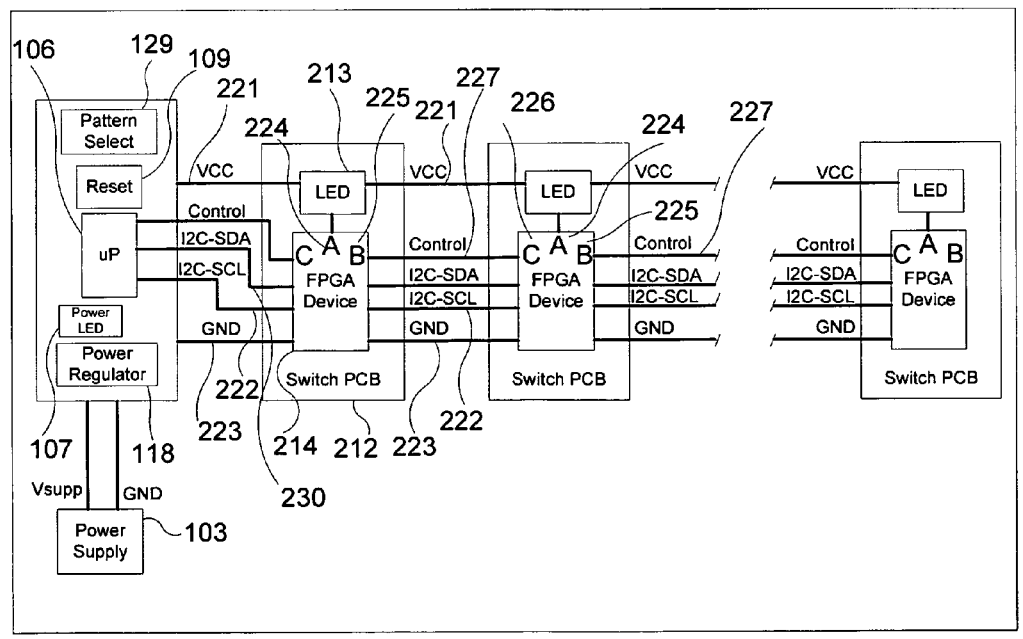
FIG. 5 is another embodiment of an individually selective intelligent serial lighting system block diagram of the present invention wherein FPGA devices are used in Switch PCB assemblies.

Referring to FIG. 4 and FIG. 5, in another embodiment, Controller Unit 101 is connected to a cable assembly consisting at least one switch printed circuit board (PCB) assembly 212, distributed along the length of 5-conductor cable 211. Adjacent switch PCBs are interconnected through cable 211, which has 5 individual conductors 216 including VCC wire 221, ground wire 223, control wire 227, I2C-SCL i2c clock wire 222, and I2C-SDA i2c data wire 230, soldered to switch printed circuit board assembly 212. Heatshrink 215 is covering and protecting switch printed circuit board assembly 212 and wires 216. switch printed circuit board assembly 212 comprising: two LEDs 213, one mounted on component side, and the other one mounted on solder side of PCB; FPGA device 214; a current limiting resistor (not shown). Optional 5 pin male circular DIN rear end connector 217 is used to attach another cable assembly in order to extend the length of light string. Controller printed circuit board assembly 102, which is mounted inside controller unit 101 through four mounting holes 108, comprising: microcontroller 106; power regulator circuit 118; power supply connector 105; reset pushbutton 109; pattern select pushbutton 129; and power indicator LED 107. Wall adapter 103 provides required DC supply voltage through power plug 104.

FIG. 5 is a sketch of another embodiment of an individually selective intelligent serial lighting system block diagram. As can be seen, port B 225 of the very first FPGA device 214 of the chain is connected to port C 226 of the very next adjacent FPGA device 214 on switch printed circuit board assembly 212. Similarly, port B 225 of the second FPGA device 214 is connected to port C 226 of the very next adjacent FPGA device. This same pattern of connection continues through the last FPGA device in the chain. On every switch printed circuit board assembly 212, a pair of LED 213 is electrically connected in parallel and pulled up to VCC 221. LED 213 is driven by port A 224 of FPGA device through a current limiting series resistor.

Based on hardware configuration described above, upon power up, software routines search and register all existing serial numbers of all FPGA devices present in the entire system. Software algorithms, through control line 227, I2C-SCL i2c clock line 222, and I2C-SDA i2c data line 230, then probe, read, sort and record position of each individual FPGA device 214.

When software routines find all existing FPGA devices and recognize their position, it generates variety of patterns based on the position of lighting element in light string by addressing each individual recognized and recorded serial number. All existing patterns provided by software are played in sequence and rolled over at the end. When system is in operation and alive, software routines continuously check all existing devices against recorded ones to detect and recognize any change in quantity, position and serial number of FPGA devices in the entire chain.

Select pattern pushbutton 129, sequentially selects each pattern provided by software and continuously plays selected pattern until select pattern pushbutton 129 is pressed again to play the next pattern.

A reset pushbutton 109 is provided to reset the system and initiate the search routines as described above.

Description of the invention provided here is by the way of example embodiments and is not intended as limiting.

I claim:

1. An individually selective intelligent serial lighting system comprising:
   a. a control unit to generate and process communication data,
   b. a plurality of at least one set of extendable serial light string, and a power source
   c. said control unit comprising a main printed circuit board assembly, said main printed circuit board assembly comprising: a microcontroller device, memory containing control unit's software routines, integrated circuit switch device driver, a power regulator, reset pushbutton, at least one pattern select pushbutton, power switch, power indicator LED, a connector to connect the serial light string chain to the control unit and a power supply connector,
   d. said serial light string each consisting of a plurality of at least one switch printed circuit board assembly, said switch printed circuit board assembly distributed along a length of each serial light string,
   e. each said switch printed circuit board assembly comprising: a dual channel addressable switch, said addressable switch having at least one bi-directional port A and one output port B as control pin, and a unique 64-bit lasered ROM serial number and an illumination device said illumination device being at least one selected from a light emitting diode, a laser diode, a multi color light emitting diode, and a light bulb.

2. The individually selective intelligent serial lighting system of claim 1, wherein each said switch printed circuit board assembly in the chain, is serially connected to a very next adjacent switch printed circuit board assembly at each end, by a fixed set of interconnect wires comprising: one power supply wire, one control signal wire, one communication wire and one system return ground wire.

3. The individually selective intelligent serial lighting system of claim 2, wherein each said unique 64-bit lasered ROM serial number is used in software to address and select each individual said switch printed circuit board assembly, by sharing a communication protocol on a common bus with all other dual channel addressable switch devices.

4. The individually selective intelligent serial lighting system of claim 3, wherein said port B control pin of each dual channel addressable switch in the chain is connected to port A of the very next adjacent dual channel addressable switch.

5. The individually selective intelligent serial lighting system of claim 4, wherein said port A of each dual channel addressable switch, either directly drives at least one light emitting diode (LED) or laser diode, mounted on the switch printed circuit board assembly and pulled up to power supply through a current limiting resistor, or drives and controls at least one illumination device or light bulb assembly through a device driver circuit.

6. The individually selective intelligent serial lighting system of claim 5, wherein control unit's software routines, through the communication line, generate variety of patterns by addressing each individual dual channel addressable switch device in the chain.

7. The individually selective intelligent serial lighting system of claim 6, wherein patterns generated by said control unit's software are individually selected by said at least one select pushbutton of said control unit.

8. The individually selective intelligent serial lighting system of claim 1, wherein each one of said switch printed circuit board assembly comprise a programmable integrated circuit device, said device capable of being programmed with a standard inter-integrated circuit ($I^2C$) communication protocol module, said module having at least one single bit output port A, at least one single bit output port B, at least one single bit input port C, and a unique at least 16 bits wide identifiable identity serial number, said serial number used in the control unit's software to address and select each individual said switch printed circuit board assembly.

9. The individually selective intelligent serial lighting system of claim 8, wherein each said switch printed circuit board assembly in the chain, is serially connected to the very next adjacent switch printed circuit board assembly at each end, by fixed set of interconnect wires comprising: one power supply wire, one control signal wire, one clock wire, one data wire, and one system return ground wire.

10. The individually selective intelligent serial lighting system of claim 9, wherein said output port B control pin of each said programmable integrated circuit device in said light string is connected to said input port C of the very next adjacent said programmable integrated circuit device while said port A of each said programmable integrated circuit device drives the at least one illumination device, mounted on the switch printed circuit board assembly by pulling said illumination device up to power supply through a current limiting resistor, or drives and controls the at least one illumination device through a device driver circuit.

11. The individually selective intelligent serial lighting system of claim 10, wherein the control unit's software routines generate a variety of light patterns by addressing each individual programmable integrated circuit device in the chain.

12. The individually selective intelligent serial lighting system of claim 11, wherein the said light patterns generated by said control unit's software are individually selected by said at least one select pushbutton of said control unit.

* * * * *